(12) United States Patent
Kitani et al.

(10) Patent No.: US 8,873,010 B2
(45) Date of Patent: Oct. 28, 2014

(54) LIQUID CRYSTAL DISPLAY DEVICE

(71) Applicants: Masakatsu Kitani, Fukaya (JP); Jin Hirosawa, Saitama (JP)

(72) Inventors: Masakatsu Kitani, Fukaya (JP); Jin Hirosawa, Saitama (JP)

(73) Assignee: Japan Display Inc., Tokyo (JP)

( * ) Notice: Subject to any disclaimer, the term of this patent is extended or adjusted under 35 U.S.C. 154(b) by 59 days.

(21) Appl. No.: 13/651,695

(22) Filed: Oct. 15, 2012

(65) Prior Publication Data

US 2013/0093973 A1    Apr. 18, 2013

(30) Foreign Application Priority Data

Oct. 17, 2011    (JP) .................. 2011-227766

(51) Int. Cl.
  *G02F 1/1343*    (2006.01)
  *G02F 1/136*     (2006.01)
  *G02F 1/1337*    (2006.01)

(52) U.S. Cl.
  CPC ...................................... *G02F 1/136* (2013.01)
  USPC .............................. 349/141; 349/42; 349/130

(58) Field of Classification Search
  USPC ......................................................... 349/141
  See application file for complete search history.

(56) References Cited

U.S. PATENT DOCUMENTS

| | | | |
|---|---|---|---|
| 6,266,116 | B1 | 7/2001 | Ohta et al. |
| 6,542,212 | B2 * | 4/2003 | Yoshida et al. ............... 349/141 |
| 8,542,329 | B2 * | 9/2013 | Hirosawa ..................... 349/39 |
| 2001/0010575 | A1 | 8/2001 | Yoshida et al. |
| 2004/0165136 | A1 | 8/2004 | Sugiyama et al. |
| 2005/0206824 | A1 | 9/2005 | Son et al. |
| 2005/0219453 | A1 | 10/2005 | Kubo et al. |
| 2007/0115234 | A1 | 5/2007 | Kim et al. |
| 2008/0062358 | A1 | 3/2008 | Lee et al. |
| 2008/0180590 | A1 | 7/2008 | Lee et al. |
| 2008/0180623 | A1 | 7/2008 | Lee et al. |
| 2008/0186439 | A1 | 8/2008 | Kwon et al. |
| 2012/0293752 | A1 * | 11/2012 | Takeda et al. ................... 349/96 |

FOREIGN PATENT DOCUMENTS

| | | |
|---|---|---|
| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |
| JP | 2009-192822 | 8/2009 |

* cited by examiner

*Primary Examiner* — Dennis Y Kim
(74) *Attorney, Agent, or Firm* — Oblon, Spivak, McClelland, Maier & Neustadt, L.L.P.

(57) ABSTRACT

According to one embodiment, a device includes a first substrate including a gate line, a source line which extends to intersect with the gate line, a pixel electrode which includes a primary pixel electrode extending substantially parallel to the source line, and a switching element located at the intersection of the gate line and the source line, a second substrate includes a common electrode which extends substantially parallel to the primary pixel electrode on both sides across the primary pixel electrode, and a liquid crystal layer including liquid crystal molecules held between the first and second substrates. The switching element includes a drain line which is electrically connected to the pixel electrode and which is located to overlap the gate line.

18 Claims, 8 Drawing Sheets

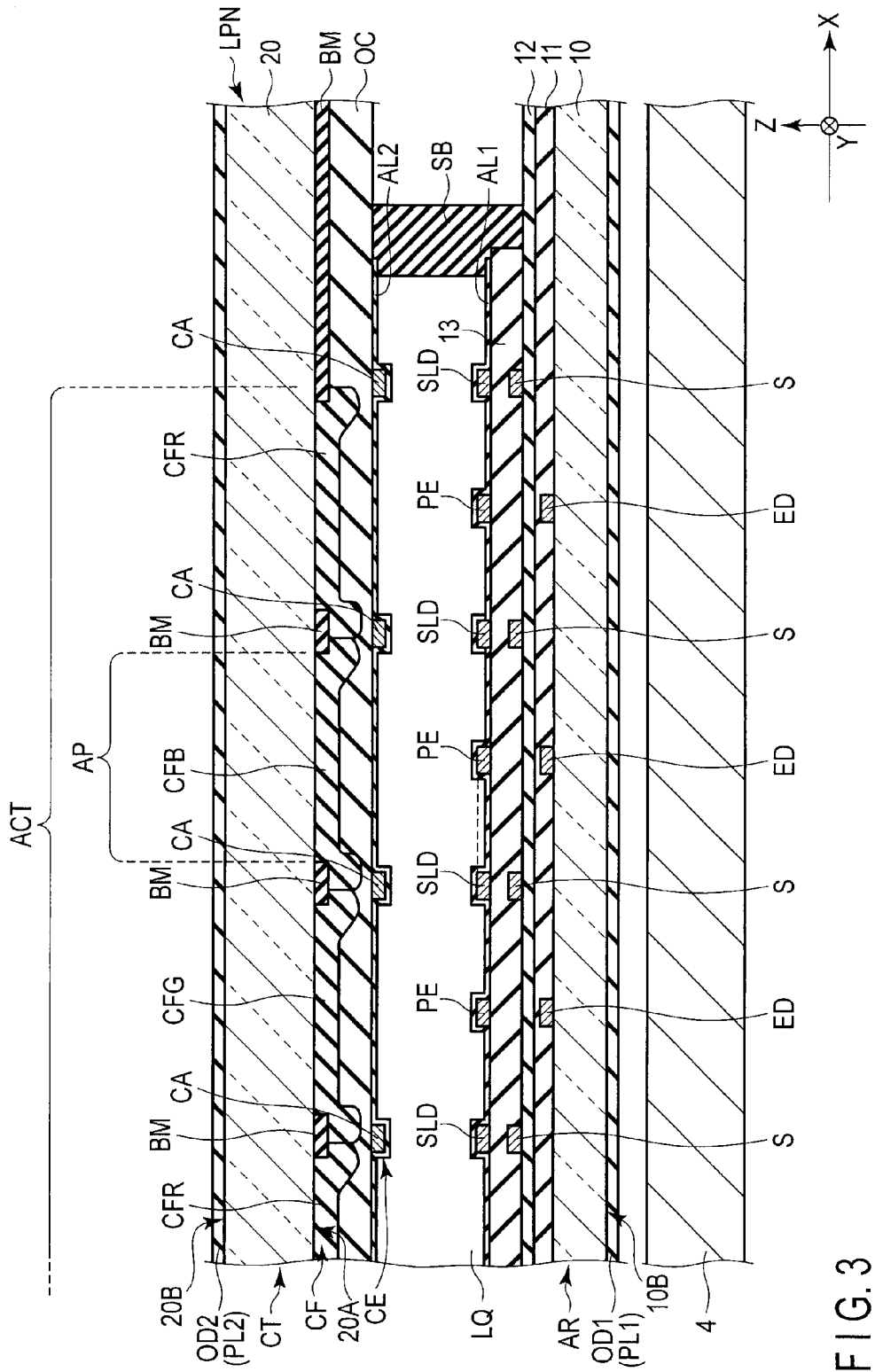
F I G. 3

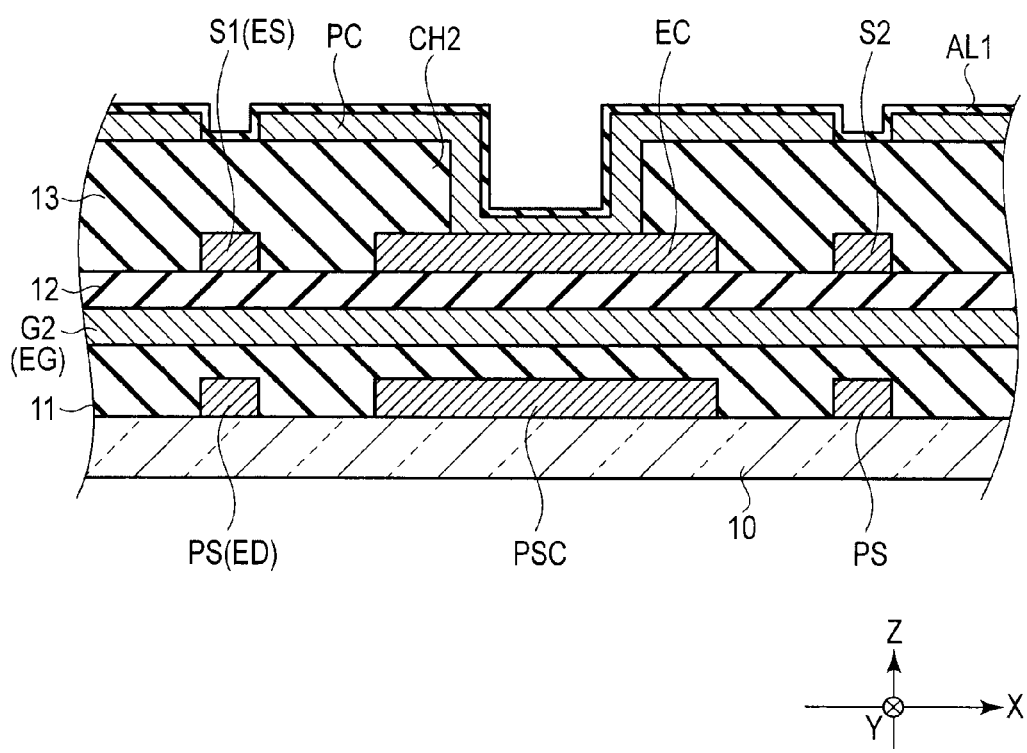
F I G. 4

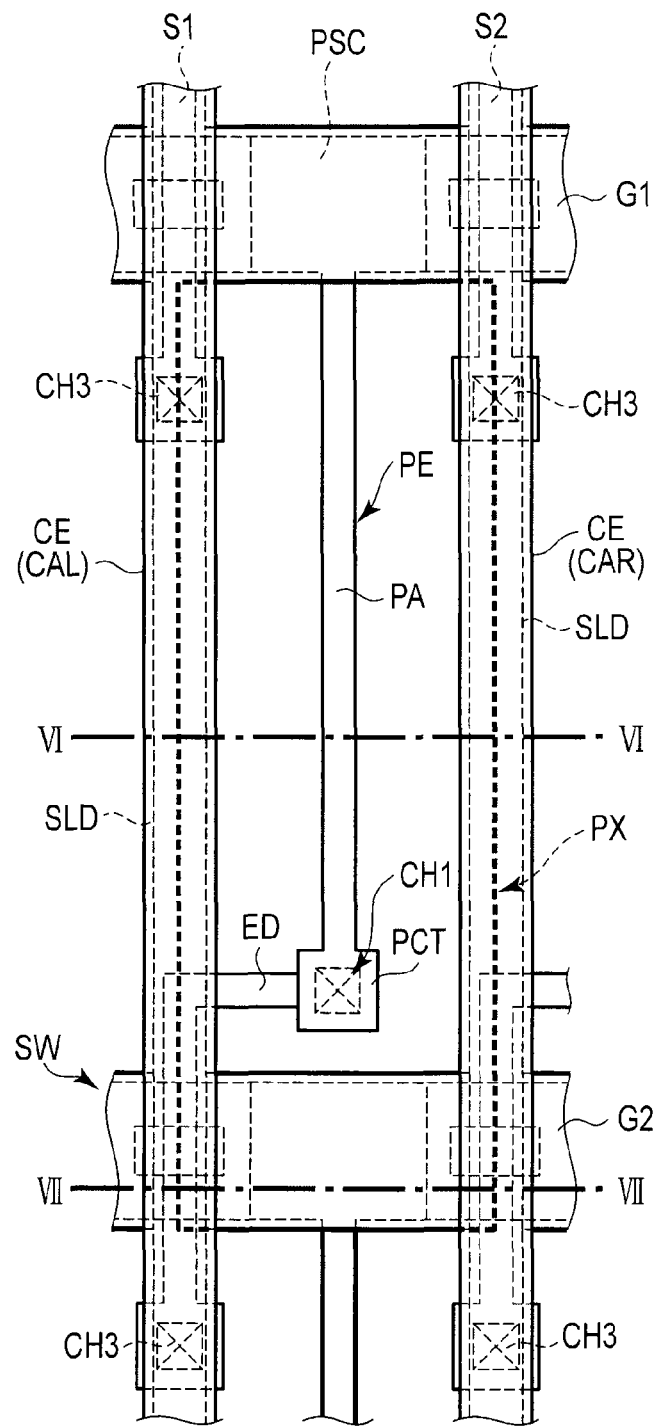
F I G. 5

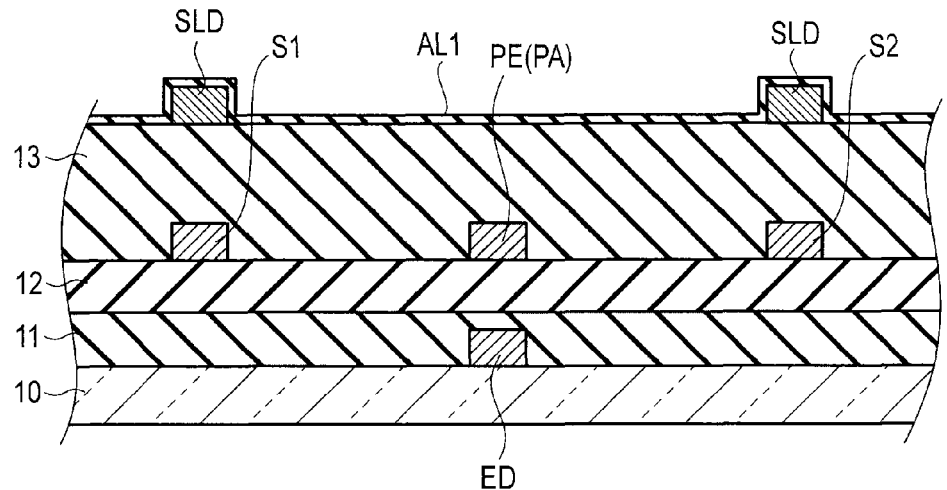
F I G. 6
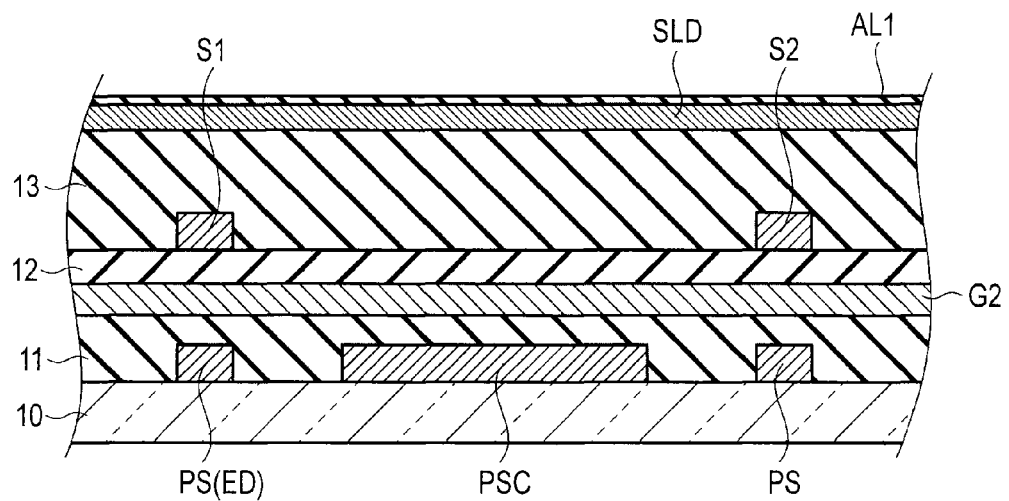
F I G. 7

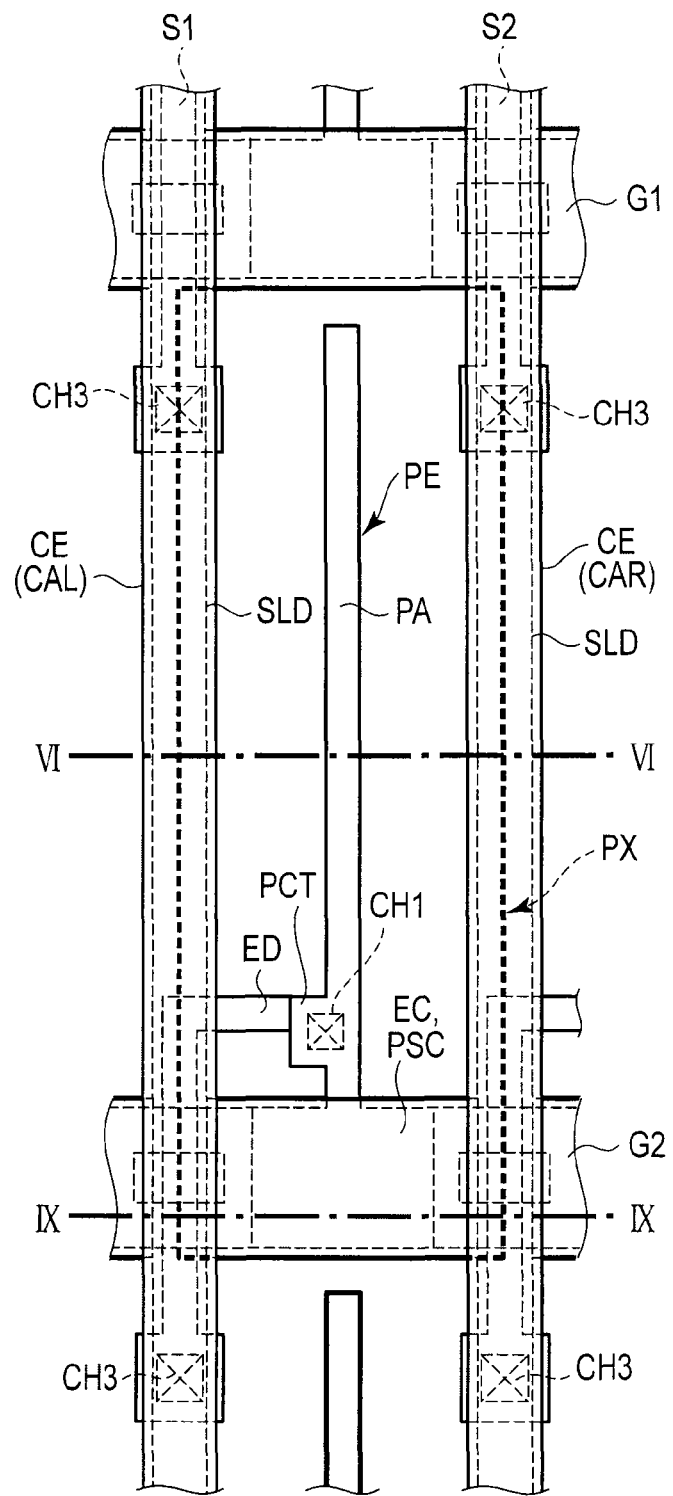
F I G. 8

LIQUID CRYSTAL DISPLAY DEVICE

CROSS-REFERENCE TO RELATED APPLICATIONS

This application is based upon and claims the benefit of priority from Japanese Patent Application No. 2011-227766, filed Oct. 17, 2011, the entire contents of which are incorporated herein by reference.

FIELD

Embodiments described herein relate generally to a liquid crystal display device.

BACKGROUND

Recently, flat display devices have been actively developed, and among others, a liquid crystal display device has been particularly drawing attention for its advantages such as light weight, small thickness, and low power consumption. In particular, regarding an active matrix type liquid crystal display device in which a switching element is incorporated in each pixel, attention has been focused on a structure that uses a lateral electric field (including a fringe electric field), such as an in-plane switching (IPS) mode and a fringe field switching (FFS) mode. The liquid crystal display device of such a lateral electric field mode comprises pixel electrodes and a common electrode that are formed in an array substrate, and switches a liquid crystal molecule by a lateral electric field substantially parallel to the main surface of the array substrate.

On the other hand, there has also been suggested a technique for switching liquid crystal molecules by a lateral electric field or an oblique electric field generated between pixel electrodes formed on an array substrate and a common electrode formed on a countersubstrate.

BRIEF DESCRIPTION OF THE DRAWINGS

FIG. 3 is a sectional view schematically showing a sectional structure when the liquid crystal display panel shown in FIG. 2 is cut along the line III-III;

FIG. 4 is a sectional view schematically showing a sectional structure when the liquid crystal display panel shown in FIG. 2 is cut along the line IV-IV;

FIG. 5 is a plan view schematically showing another structure example of one pixel when the liquid crystal display panel shown in FIG. 1 is viewed from the side of the countersubstrate;

FIG. 6 is a sectional view schematically showing a sectional structure when the liquid crystal display panel shown in FIG. 5 is cut along the line VI-VI;

FIG. 7 is a sectional view schematically showing a sectional structure when the liquid crystal display panel shown in FIG. 5 is cut along the line VII-VII;

FIG. 8 is a plan view schematically showing another structure example of one pixel when the liquid crystal display panel shown in FIG. 1 is viewed from the side of the countersubstrate.

DETAILED DESCRIPTION

Figure 1:
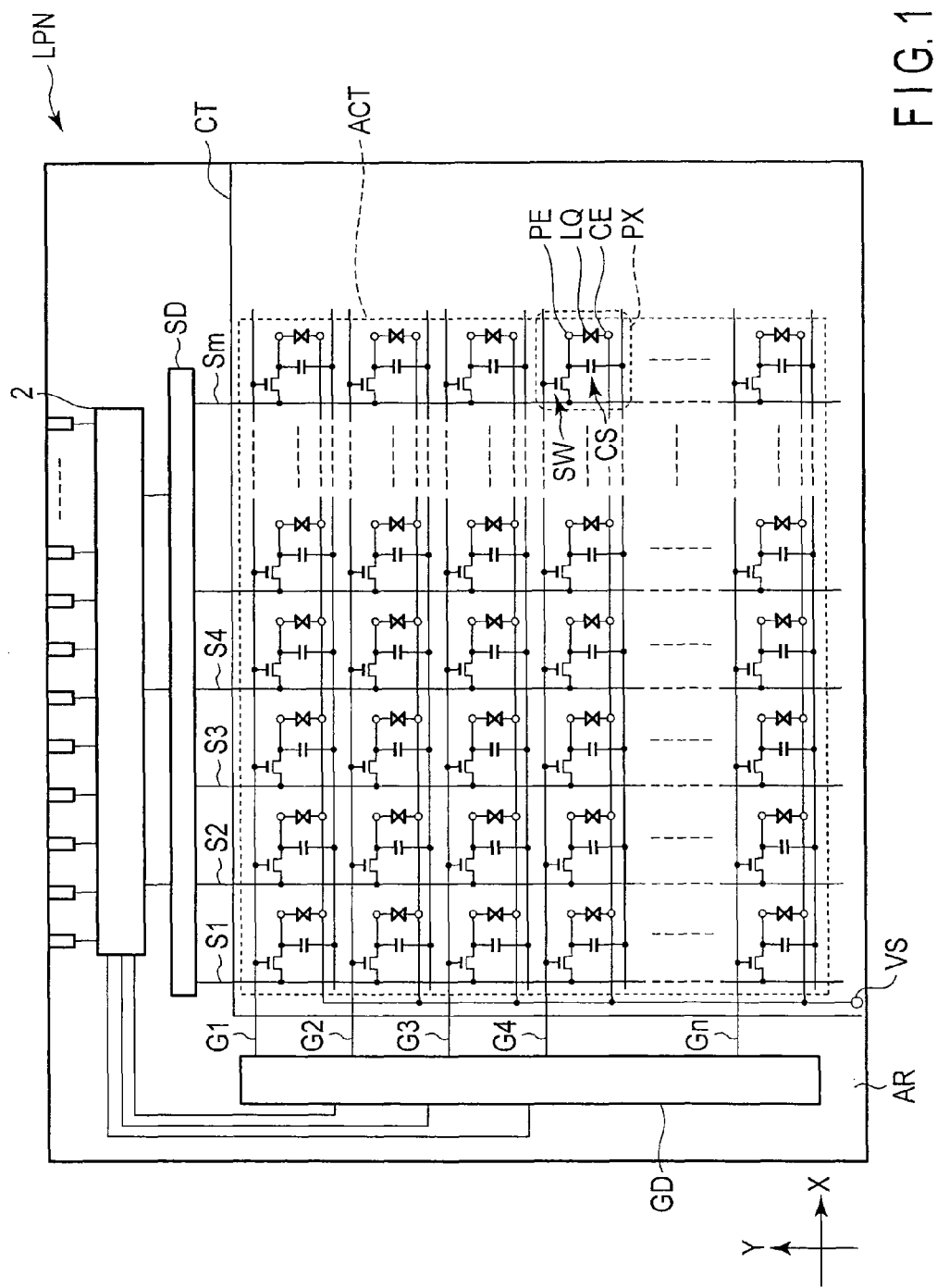
FIG. 1 is a diagram schematically showing an example of the configuration and an equivalent circuit of a liquid crystal display device according to an embodiment.

In general, according to one embodiment, a liquid crystal display device comprises a first substrate, the first substrate comprising a gate wiring line, a source wiring line which extends to intersect with the gate wiring line, a pixel electrode which comprises a primary pixel electrode extending substantially parallel to the source wiring line, and a switching element located at the intersection of the gate wiring line and the source wiring line; a second substrate comprising a common electrode which extends substantially parallel to the primary pixel electrode on both sides across the primary pixel electrode; and a liquid crystal layer comprising liquid crystal molecules held between the first substrate and the second substrate. The switching element comprises a drain wiring line which is electrically connected to the pixel electrode and which is located to overlap the gate wiring line.

Hereinafter, the embedment will be described in detail with reference to the drawings. It is to be noted that components having identical or similar functions are provided with the same reference numerals throughout the drawings and are not repeatedly described.

FIG. 1 is a diagram schematically showing an example of the configuration and an equivalent circuit of the liquid crystal display device according to the present embodiment.

That is, the liquid crystal display device comprises an active matrix type liquid crystal display panel LPN. The liquid crystal display panel LPN comprises an array substrate AR which is a first substrate, a countersubstrate CT which is a second substrate located to face the array substrate AR, and a liquid crystal layer LQ held between the array substrate AR and the countersubstrate CT. Such a liquid crystal display panel LPN comprises an active area ACT for displaying images. The active area ACT comprises a plurality of pixels PX arranged in m×n matrix form (note that m and n are positive integers).

The liquid crystal display panel LPN comprises, in the active area ACT, n gate wiring lines G (G1 to Gn) and m source wiring lines S (S1 to Sm). The gate wiring lines G substantially linearly extend, for example, along a first direction X. The gate wiring lines G are arranged along a second direction Y that intersects with the first direction X. Here, the first direction X and the second direction Y are substantially perpendicular to each other. The source wiring lines S intersect with the gate wiring lines G. The source wiring lines S substantially linearly extend along the second direction Y. The gate wiring lines G and the source wiring lines S do not necessarily have to linearly extend and may be partly bent.

Each of the gate wiring lines G is drawn out of the active area ACT, and is connected to a gate driver GD. Each of the source wiring lines S is drawn out of the active area ACT, and is connected to a source driver SD. The gate driver GD and the source driver SD are at least partly connected to, for example, a drive IC chip 2 which is formed in the array substrate AR and which has a controller therein.

Each of the pixels PX comprises a switching element SW, a pixel electrode PE, and a common electrode CE.

In the present embodiment, the liquid crystal display panel LPN is configured to have the pixel electrode PE formed in the array substrate AR and at least part of the common electrode CE formed in the countersubstrate CT. An electric field formed between the pixel electrode PE and the common electrode CE is mainly used to switch liquid crystal molecules in the liquid crystal layer LQ. The electric field formed between the pixel electrode PE and the common electrode CE is an oblique electric field slightly tilted relative to an X-Y plane defined by the first direction X and the second direction Y or relative to the main surface of the substrate (or is a lateral electric field substantially parallel to the main surface of the substrate).

The switching element SW comprises, for example, an n-channel thin film transistor (TFT). This switching element SW is electrically connected to the gate wiring line G and the source wiring line S. Such a switching element SW may be either a top gate type or a bottom gate type. Although a semiconductor layer of the switching element SW is made of, for example, polysilicon, the semiconductor layer may otherwise be made of amorphous silicon.

The pixel electrode PE is located in each of the pixels PX, and is electrically connected to the switching element SW. The common electrode CE is located to be shared by the pixel electrodes PE of the pixels PX via the liquid crystal layer LQ. The pixel electrode PE and the common electrode CE are made of a light-transmitting conductive material such as indium tin oxide (ITO) or indium zinc oxide (IZO), but may otherwise be made of other metal materials such as aluminum.

The array substrate AR comprises a power supply VS for applying a voltage to the common electrode CE. This power supply VS is formed, for example, outside the active area ACT. The common electrode CE is drawn out of the active area ACT, and is electrically connected to the power supply VS via an unshown conductive member.

Figure 2:
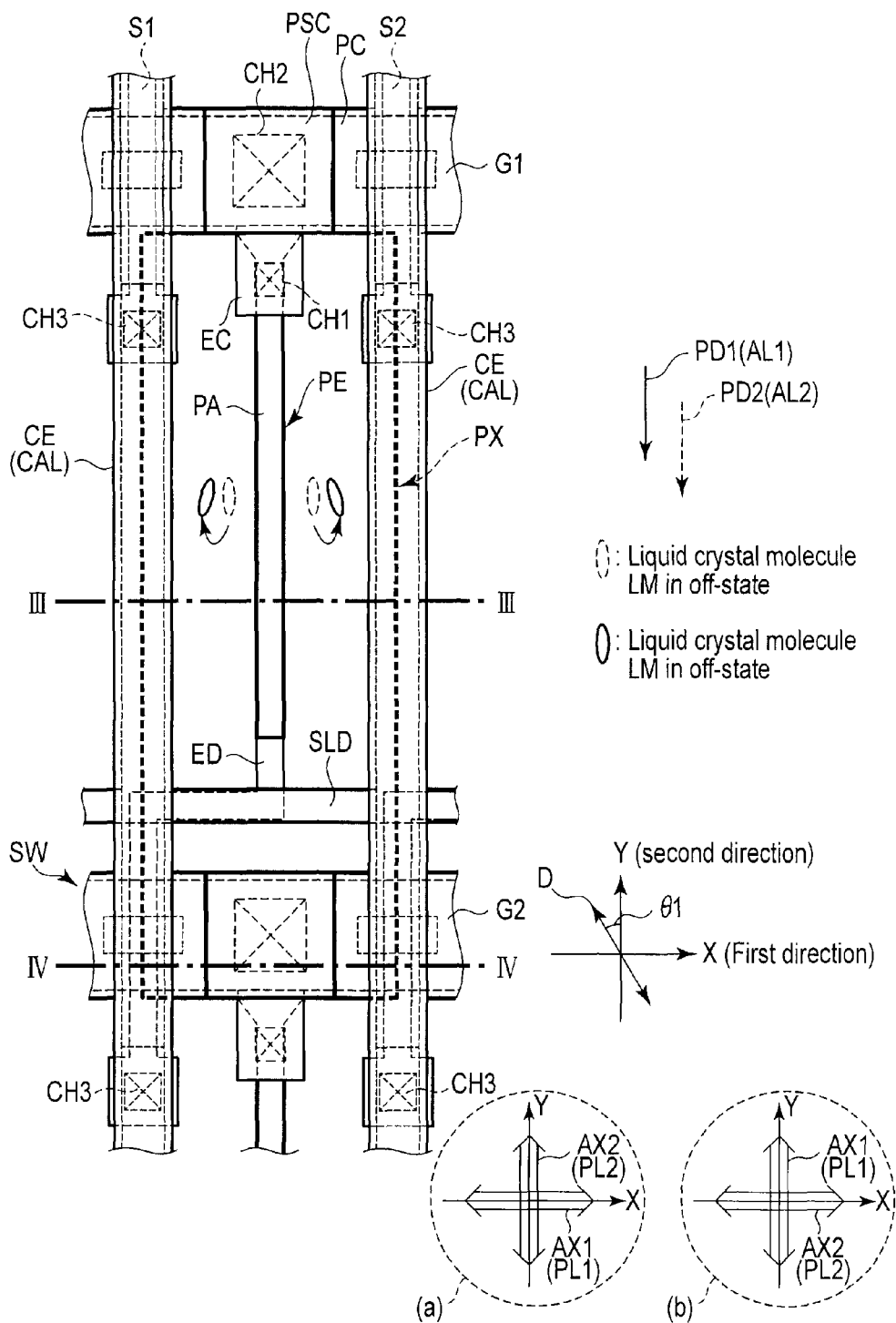
FIG. 2 is a plan view schematically showing a structure example of one pixel when a liquid crystal display panel shown in FIG. 1 is viewed from the side of a countersubstrate.

FIG. 2 is a plan view schematically showing a structure example of one pixel PX when the liquid crystal display panel LPN shown in FIG. 1 is viewed from the side of the counter-substrate. Here, a plan view in the X-Y plane is shown.

The shown pixel PX has an oblong shape smaller in the length along the first direction X than in the length along the second direction Y, as indicated by broken lines. The gate wiring line G1 and the gate wiring line G2 extend along the first direction X. The source wiring line S1 and the source wiring line S2 extend along the second direction Y. The pixel electrode PE is located between the source wiring line S1 and the source wiring line S2 that are adjacent to each other. This pixel electrode PE partly overlaps the gate wiring line G1, and extends toward the gate wiring line G2 between the gate wiring line G1 and the gate wiring line G2.

In the example shown, in the pixel PX, the source wiring line S1 is located at the left end, and the source wiring line S2 is located at the right end. Strictly, the source wiring line S1 is located on the border between the pixel PX and the left adjacent pixel, and the source wiring line S2 is located on the border between the pixel PX and the right adjacent pixel.

The gate wiring line G1 is located along the upper end of the pixel PX, and the gate wiring line G2 is located along the lower end of the pixel PX. Strictly, the gate wiring line (adjacent gate wiring line) G1 is located in the pixel adjacent along the border between the pixel PX and the upper adjacent pixel, and the gate wiring line G2 is located in the pixel PX along the border between the pixel PX and the lower adjacent pixel.

In the example shown, the switching element SW is electrically connected to the gate wiring line G2 and the source wiring line S1. The switching element SW is provided at the intersection of the gate wiring line G2 and the source wiring line S1.

A drain wiring line ED of the switching element SW extends along the source wiring line S1 and a shield layer SLD, and further extends along a primary pixel electrode PA of the pixel electrode PE from a region the overlaps the shield layer SLD. The shield layer SLD is located in a part of the upper layer of the drain wiring line ED extending substantially parallel to the gate wiring line G. The drain wiring line ED is located to overlap the primary pixel electrode PA up to the vicinity of the gate wiring line G1, and is electrically connected to a semiconductor layer PSC located to overlap the gate wiring line G1.

The drain wiring line ED is electrically connected to the pixel electrode PE via a contact hole CH1 formed in the vicinity of the gate wiring line G1 and via a contact hole CH2 formed in a region that overlaps the gate wiring line G1. That is, the drain wiring line ED is electrically connected to an auxiliary capacitive electrode EC in the contact hole CH1. The auxiliary capacitive electrode EC extends to overlap the gate wiring line G1 and is thus electrically connected to the pixel electrode PE in the contact hole CH2. Accordingly, auxiliary capacities Cs are formed between the auxiliary capacitive electrode EC and the gate wiring line G1 and between the semiconductor layer PSC and the gate wiring line G1. The position to provide the contact hole CH2 is not exclusively the region that overlaps the gate wiring line G1. However, when the contact hole CH2 is located at the position that overlaps the gate wiring line G1, it is possible to avoid the deterioration of display quality resulting from the disturbed alignment of liquid crystal caused by the asperities of the part in which the contact hole CH2 is provided.

A source electrode ES of the switching element SW is electrically connected to (or formed integrally with) the source wiring line S1, and is electrically connected to a semiconductor layer PS in a contact hole CH3 on the side of the adjacent pixel beyond the gate wiring line G2.

A gate electrode EG of the switching element SW is electrically connected to (or formed integrally with) the gate wiring line G2, and faces, at two places, the semiconductor layer PS extending in the second direction Y. That is, the switching element SW is a double gate type switching element.

This switching element SW is provided in a region that overlaps the source wiring line S1 and the primary pixel electrode PA, hardly extends out of the region that overlaps the source wiring line S1, and inhibits the reduction of the area of an opening contributing to display.

The pixel electrode PE comprises the primary pixel electrode PA and a secondary pixel electrode PC that are electrically connected to each other. The primary pixel electrode PA linearly extends along the second direction Y from the secondary pixel electrode PC to the vicinity of the lower end of the pixel PX. This primary pixel electrode PA is in the shape of a strip having a uniform width along the first direction X. The secondary pixel electrode PC is located in the region that overlaps the gate wiring line G1, and is electrically connected to the auxiliary capacitive electrode EC via the contact hole CH2. The secondary pixel electrode PC is formed to be wider than the primary pixel electrode PA, and covers and shields part of the gate wiring line G.

This pixel electrode PE is located at a substantially intermediate position between the source wiring line S1 and the source wiring line S2, that is, located in the center of the pixel PX in the first direction X. The distance between the source wiring line S1 and the pixel electrode PE along the first direction X is substantially equal to the distance between the source wiring line S2 and the pixel electrode PE along the first direction X.

The shield layer SLD extends along the second direction Y toward the upper end of the pixel PX from the position where the drain wiring line ED intersects with the source wiring lines S1 and S2, to overlap the source wiring lines S1 and S2.

The shield layer SLD is located to face the source wiring lines S1 and S2 except for regions that overlap the gate wiring line G1 and G2 and their vicinities. The shield layer SLD has the same potential as, for example, the common electrode CE.

The common electrode CE comprises a primary common electrode CA. In the X-Y plane, the primary common electrode CA linearly extends on both sides across the primary pixel electrode PA along the second direction Y substantially parallel to the primary pixel electrode PA. In other words, the primary common electrode CA faces each source wiring line S, and extends substantially parallel to the primary pixel electrode PA. This primary common electrode CA is in the shape of a strip having a uniform width along the first direction X.

In the example shown, two primary common electrodes CA are arranged parallel to one another along the first direction X, and are located at right and left ends of the pixel PX, respectively. Hereinafter, in order to differentiate these primary common electrodes CA, the left primary common electrode in the diagram is referred to as CAL, and the right primary common electrode in the diagram is referred to as CAR. The primary common electrode CAL faces the source wiring line S1, and the primary common electrode CAR faces the source wiring line S2. The primary common electrode CAL and the primary common electrode CAR are electrically connected to each other inside or outside the active area.

In the pixel PX, the primary common electrode CAL is located at the left end, and the primary common electrode CAR is located at the right end. Strictly, the primary common electrode CAL is located on the border between the pixel PX and the left adjacent pixel, and the primary common electrode CAR is located on the border between the pixel PX and the right adjacent pixel.

With regard to the positional relation between the pixel electrode PE and the primary common electrode CA, the pixel electrodes PE and the primary common electrodes CA are alternately arranged along the first direction X. The pixel electrodes PE and the primary common electrodes CA are arranged substantially parallel to each other. In this case, in the X-Y plane, none of the primary common electrodes CA overlap the pixel electrodes PE.

That is, one pixel electrode PE is located between the primary common electrode CAL and the primary common electrode CAR that are adjacent to each other. In other words, the primary common electrode CAL and the primary common electrode CAR are arranged on two sides across the position immediately above the pixel electrode PE. Alternatively, the pixel electrode PE is located between the primary common electrode CAL and the primary common electrode CAR. Thus, the primary common electrode CAL, the primary pixel electrode PA, and the primary common electrode CAR are arranged along the first direction X in this order.

The distance between the pixel electrode PE and the common electrode CE along the first direction X is substantially uniform. That is, the distance between the primary common electrode CAL and the primary pixel electrode PA along the first direction X is substantially equal to the distance between the primary common electrode CAR and the primary pixel electrode PA along the first direction X.

FIG. 3 is a sectional view schematically showing a sectional structure when the liquid crystal display panel LPN shown in FIG. 2 is cut along the line III-III. Here, parts necessary for an explanation are only shown.

A backlight unit 4 is located in the rear of the array substrate AR that constitutes the liquid crystal display panel LPN. Various forms of backlight units 4 are applicable. Moreover, a backlight unit that uses a light-emitting diode (LED) or a cold cathode fluorescent lamp (CCFL) as a light source is also applicable. The detailed structure of the backlight unit is not described.

The array substrate AR is formed by using a light-transmitting first insulating substrate 10. The drain wiring line ED of the switching element SW is formed on the first insulating substrate 10, and is covered by a gate insulating film 11 and a first interlayer insulating film 12. The source wiring line S is formed on the gate insulating film 11 and the first interlayer insulating film 12, and is covered by a second interlayer insulating film 13. The unshown gate wiring line is located, for example, between the gate insulating film 11 and the first interlayer insulating film 12. The pixel electrode PE and the shield layer SLD are formed on the second interlayer insulating film 13. The pixel electrode PE is located inside the positions immediately above the adjacent source wiring lines S. The shield layer SLD is located to face the source wiring line S.

A first alignment film AL1 is located on the surface of the array substrate AR facing the countersubstrate CT, and extends over substantially the entire active area ACT. This first alignment film AL1 covers the pixel electrode PE and others, and is also located on the first interlayer insulating film 12. Such a first alignment film AL1 is made of a material that shows a horizontal alignment property.

The array substrate AR may further comprise part of the common electrode CE.

The countersubstrate CT is formed by using a light-transmitting second insulating substrate 20. This countersubstrate CT comprises black matrixes BM, color filters CF, an overcoat layer OC, the common electrode CE, and a second alignment film AL2.

The black matrixes BM separate the pixels PX, and form an aperture AP facing the pixel electrode PE. That is, the black matrix BM is located to face wiring lines such as the source wiring lines S, the unshown gate wiring lines, the unshown auxiliary capacitive lines, and the switching element. Although a part of the black matrix BM that extends along the second direction Y is only shown here, the black matrix BM may comprise a part that extends along the first direction X. This black matrix BM is located in an inner surface 20A of the second insulating substrate 20 facing the array substrate AR.

The color filter CF is located to correspond to each pixel PX. That is, the color filter CF is located in the aperture AP in the inner surface 20A of the second insulating substrate 20, and is partly put on the black matrix BM. The color filters CF located in the pixels PX adjacent in the first direction X have different colors. For example, the color filters CF are made of resin materials having three primary colors including red, blue, and green. The red color filter CFR made of the red resin material is located to correspond to the red pixel. The blue color filter CFB made of the blue resin material is located to correspond to the blue pixel. The green color filter CFG made of the green resin material is located to correspond to the green pixel. The border between the color filters CF is located to overlap the black matrix BM.

The overcoat layer OC covers the color filter CF. This overcoat layer OC eases the influence of the unevenness of the surface of the color filter CF.

The common electrode CE is formed on the side of the overcoat layer OC facing the array substrate AR. The distance between the common electrode CE and the pixel electrode PE along a third direction Z is substantially uniform. The third direction Z is a direction perpendicular to the first direction X and the second direction Y, or is the normal direction of the liquid crystal display panel LPN.

The second alignment film AL2 is located on the surface of the countersubstrate CT facing the array substrate AR, and extends over substantially the entire active area ACT. This second alignment film AL2 covers the common electrode CE and the overcoat layer OC. Such a second alignment film AL2 is made of a material that shows a horizontal alignment property.

The first alignment film AL1 and the second alignment film AL2 have been subjected to an alignment process (e.g. rubbing and a light alignment process) for the initial alignment of the liquid crystal molecules in the liquid crystal layer LQ. A first alignment process direction PD1 in which the first alignment film AL1 initially aligns the liquid crystal molecules is parallel to and is opposite to or the same as a second alignment process direction PD2 in which the second alignment film AL2 initially aligns the liquid crystal molecules. For example, the first alignment process direction PD1 and the second alignment process direction PD2 are substantially parallel to and the same as the second direction Y, as shown in FIG. 2.

The array substrate AR and the countersubstrate CT described above are located so that the first alignment film AL1 and the second alignment film AL2 face each other. In this case, between the first alignment film AL1 of the array substrate AR and the second alignment film AL2 of the countersubstrate CT, a predetermined cell gap, for example, a cell gap of 2 to 7 µm is formed by a columnar spacer. The columnar spacer is integrally formed on one of the substrates, for example, by a resin material. The array substrate AR and the countersubstrate CT are affixed to each other by a sealing material SB outside the active area ACT so that the predetermined cell gap is formed.

The liquid crystal layer LQ is held in the cell gap formed between the array substrate AR and the countersubstrate CT, and is located between the first alignment film AL1 and the second alignment film AL2. Such a liquid crystal layer LQ is made of, for example, a liquid crystal material having positive dielectric anisotropy.

A first optical device OD1 is affixed, for example, by an adhesive agent to the outer surface of the array substrate AR, that is, an outer surface 10B of the first insulating substrate 10 that constitutes the array substrate AR. This first optical device OD1 is located on the side of the liquid crystal display panel LPN facing the backlight unit 4, and controls the polarization of incoming light coming into the liquid crystal display panel LPN from the backlight unit 4. This first optical device OD1 includes a first polarizing plate PL1 having a first polarization axis (or first absorption axis) AX1.

A second optical device OD2 is affixed, for example, by an adhesive agent to the outer surface of the countersubstrate CT, that is, an outer surface 20B of the second insulating substrate 20 that constitutes the countersubstrate CT. This second optical device OD2 is located on the display surface of the liquid crystal display panel LPN, and controls the polarization of outgoing light coming out of the liquid crystal display panel LPN. This second optical device OD2 includes a second polarizing plate PL2 having a second polarization axis (or second absorption axis) AX2.

The first polarization axis AX1 of the first polarizing plate PL1 and the second polarization axis AX2 of the second polarizing plate PL2 are, for example, perpendicularly positioned (cross-Nicol). In this case, one of the polarizing plates is located so that, for example, its polarization axis is parallel to or perpendicular to the initial alignment direction of the liquid crystal molecules, that is, the first alignment process direction PD1 or the second alignment process direction PD2. When the initial alignment direction is parallel to the second direction Y, the polarization axis of one of the polarizing plates is parallel to the second direction Y or parallel to the first direction X.

In FIG. 2, in an example indicated by (a), the first polarizing plate PL1 is located so that its first polarization axis AX1 is perpendicular to the initial alignment direction (second direction Y) of liquid crystal molecules LM (i.e. parallel to the first direction X), and the second polarizing plate PL2 is located so that its second polarization axis AX2 is parallel to the initial alignment direction of the liquid crystal molecules LM (i.e. parallel to the second direction Y).

In FIG. 2, in an example indicated by (b), the second polarizing plate PL2 is located so that its second polarization axis AX2 is perpendicular to the initial alignment direction (second direction Y) of the liquid crystal molecules LM (i.e. parallel to the first direction X), and the first polarizing plate PL1 is located so that its first polarization axis AX1 is parallel to the initial alignment direction of the liquid crystal molecules LM (i.e. parallel to the second direction Y).

FIG. 4 is a sectional view schematically showing a sectional structure when the liquid crystal display panel LPN shown in FIG. 2 is cut along the line IV-IV. Here, components necessary for an explanation are only shown, and other components are not shown.

The semiconductor layer PS of the switching element SW and the semiconductor layer PSC of the retention capacity Cs are formed on the first insulating substrate 10 of the array substrate AR. These semiconductor layers PS and PSC are covered by the gate insulating film 11.

The gate wiring line G2 is formed on the gate insulating film 11. The gate wiring line G2 is covered by the first interlayer insulating film 12.

The source wiring lines S1 and S2 and the auxiliary capacitive electrode EC are formed on the first interlayer insulating film 12. The source wiring lines S1 and S2 and the auxiliary capacitive electrode EC are covered by the second interlayer insulating film 13. The contact hole CH2 is provided in the second interlayer insulating film 13 on the auxiliary capacitive electrode EC.

The secondary pixel electrode PC of the pixel electrode PE is formed on the second interlayer insulating film 13. The secondary pixel electrode PC is electrically connected to the auxiliary capacitive electrode EC in the contact hole CH2. The pixel electrode PE is covered by the first alignment film AL1.

The semiconductor layer PSC is formed integrally with the drain wiring line ED of the switching element SW of one pixel shown in FIG. 2. The auxiliary capacitive electrode EC is electrically connected to the drain wiring line ED in the contact hole CH1. A predetermined signal is applied to the semiconductor layer PSC and the auxiliary capacitive electrode EC via the switching element SW, and the retention capacity Cs of the pixel (lower pixel) adjacent to the pixel shown in FIG. 2 in the Y-direction is formed between the semiconductor layer PSC shown in FIG. 4 and the gate wiring line G2.

Now, the operation of the liquid crystal display panel LPN having the above configuration is described with reference to FIG. 2 and FIG. 3.

When no voltage is applied to the liquid crystal layer LQ, that is, when no potential difference (or electric field) is formed between the pixel electrode PE and the common electrode CE (off-state), the major axes of the liquid crystal molecules LM of the liquid crystal layer LQ are aligned to be in the first alignment process direction PD1 of the first alignment film AL1 and in the second alignment process direction PD2 of the second alignment film AL2. This off-state corresponds to an initial alignment state, and the alignment direction of the liquid crystal molecules LM in the off-state corresponds to the initial alignment direction.

Strictly, the liquid crystal molecules LM are not necessarily aligned parallel to the X-Y plane, and are often pretilted. Therefore, the initial alignment direction of the liquid crystal molecules LM here is the direction in which the major axes of the liquid crystal molecules LM in the off-state are orthogonally projected in the X-Y plane. In the following explanation, for simplicity, the liquid crystal molecules LM are aligned parallel to the X-Y plane, and are rotated in a plane parallel to the X-Y plane.

Here, both the first alignment process direction PD1 and the second alignment process direction PD2 are substantially parallel to the second direction Y. In the off-state, the major axes of the liquid crystal molecules LM are initially aligned in a direction substantially parallel to the second direction Y, as indicated by broken lines in FIG. 2. That is, the initial alignment direction of the liquid crystal molecules LM is parallel to the second direction Y (or 0° to the second direction Y).

When the first alignment process direction PD1 and the second alignment process direction PD2 are parallel and identical to each other as in the example shown, the liquid crystal molecules LM are aligned substantially horizontally (at a pretilt angle of about zero) in the vicinity of the intermediate part of the liquid crystal layer LQ in the section of the liquid crystal layer LQ. The liquid crystal molecules LM are aligned at such a pretilt angle that the molecules in the vicinity of the first alignment film AL1 and the molecules in the vicinity of the second alignment film AL2 are symmetrical with respect to this part (splay alignment).

Here, if the first alignment film AL1 is aligned in the first alignment process direction PD1, the liquid crystal molecules LM in the vicinity of the first alignment film AL1 are initially aligned in the first alignment process direction PD1. If the second alignment film AL2 is aligned in the second alignment process direction PD2, the liquid crystal molecules LM in the vicinity of the second alignment film AL2 are initially aligned in the second alignment process direction PD2. When the first alignment process direction PD1 and the second alignment process direction PD2 are parallel and identical to each other, the liquid crystal molecules LM are splay-aligned as described above, and the alignment of the liquid crystal molecules LM in the vicinity of the first alignment film AL1 on the array substrate AR and the alignment of the liquid crystal molecules LM in the vicinity of the second alignment film AL2 on the countersubstrate CT are vertically symmetrical with respect to the intermediate part of the liquid crystal layer LQ as described above. This also provides optical compensation in a direction tilted from the normal direction of the substrate. Therefore, when the first alignment process direction PD1 and the second alignment process direction PD2 are parallel and identical to each other, there is a little leakage of light in the case of black display, thereby enabling a high contrast ratio and improved display quality.

When the first alignment process direction PD1 and the second alignment process direction PD2 are parallel and opposite to each other, the liquid crystal molecules LM are aliened at a substantially uniform pretilt angle in the vicinity of the first alignment film AL1, in the vicinity of the second alignment film AL2, and in the intermediate part of the liquid crystal layer LQ in the section of the liquid crystal layer LQ (homogeneous alignment).

Backlight from the backlight unit 4 partly passes through the first polarizing plate PL1, and comes into the liquid crystal display panel LPN. The polarization of the light which has come into the liquid crystal display panel LPN varies depending on the alignment state of the liquid crystal molecules LM when the light passes through the liquid crystal layer LQ. In the off-state, the light which has passed through the liquid crystal layer LQ is absorbed by the second polarizing plate PL2 (black display).

In the meantime, when a voltage is applied to the liquid crystal layer LQ, that is, when a potential difference (or electric field) is formed between the pixel electrode PE and the common electrode CE (on-state), a lateral electric field (or an oblique electric field) substantially parallel to the substrate is formed between the pixel electrode PE and the common electrode CE. The major axes of the liquid crystal molecules LM are rotated in a plane substantially parallel to the X-Y plane under the influence of the electric field, as indicated by solid lines in the drawing.

In the example shown in FIG. 2, the liquid crystal molecules LM in a region between the pixel electrode PE and the primary common electrode CAL are rotated clockwise relative to the second direction Y, and are aligned toward the lower left in the drawing. The liquid crystal molecules LM in a region between the pixel electrode PE and the primary common electrode CAR are rotated counterclockwise relative to the second direction Y, and are aligned toward the lower right in the drawing.

When an electric field is thus formed between the pixel electrode PE and the common electrode CE in each of the pixels PX, the alignment direction of the liquid crystal molecules LM is divided into a plurality of directions from the position that overlaps the pixel electrode PE, and a domain is formed in each alignment direction. That is, a plurality of domains are formed in one pixel PX.

In this on-state, the backlight which has come into the liquid crystal display panel LPN from the backlight unit 4 partly passes through the first polarizing plate PL1, and comes into the liquid crystal display panel LPN. The backlight which has come into the liquid crystal layer LQ changes its polarization state. In this on-state, at least part of the light which has passed through the liquid crystal layer LQ passes through the second polarizing plate PL2 (white display).

In the off-state, the liquid crystal molecules LM are initially aligned in a direction substantially parallel to the second direction Y. In the on-state in which a potential difference is formed between the pixel electrode PE and the common electrode CE, the optical modification rate of the liquid crystal is maximized (i.e. the transmittance in the aperture is maximized) when the director of the liquid crystal molecules LM (or the direction of the major axes of the liquid crystal molecules LM) is shifted about 45° in the X-Y plane relative to the first polarization axis AX1 of the first polarizing plate PL1 and the second polarization axis AX2 of the second polarizing plate PL2.

In the on-state, the director of the liquid crystal molecules LM between the primary common electrode CAL and the pixel electrode PE is substantially parallel to an azimuth of 45°-225° in the X-Y plane, and the director of the liquid crystal molecules LM between the primary common electrode CAR and the pixel electrode PE is substantially parallel to an azimuth of 135°-315° in the X-Y plane, so that a peak transmittance is obtained. Here, if attention is focused on a transmittance distribution per pixel, transmittance is substantially zero on the pixel electrode PE and on the common electrode CE, while a high transmittance is obtained over the entire region in an electrode gap between the pixel electrode PE and the common electrode CE.

Furthermore, according to the present embodiment, as the retention capacity Cs is formed in the region that overlaps the gate wiring line G, it is not necessary to provide any auxiliary capacitive line. Thus, according to the present embodiment, the opening of the pixel PX can be increased in size, and transmittance can be improved.

It is also possible to form the retention capacity Cs in the region that overlaps the gate wiring line G for controlling the gate voltage of the switching element SW in each pixel PX. When the retention capacity Cs is formed in the region that overlaps the adjacent gate wiring line G, the gate wiring line capacity in a scan step can be less than when the retention capacity Cs is formed in the region that overlaps the gate wiring line G for controlling the gate voltage of the switching element SW in each pixel PX.

Moreover, a punch-through voltage generated when the switching element SW is switched off can be reduced, and flickering and burn-in can be reduced.

According to the present embodiment, the deterioration of transmittance can be inhibited. This can inhibit the deterioration of display quality.

According to the present embodiment, a high transmittance can be obtained in the electrode gap between the pixel electrode PE and the common electrode CE. Therefore, in order to sufficiently increase the transmittance per pixel, it is possible to increase the inter-electrode distances between the pixel electrode PE and the primary common electrode CAL as well as the primary common electrode CAR. Moreover, for product specifications different in pixel pitch, a peak condition of a transmittance distribution can be used by changing the inter-electrode distance (i.e. by changing the location of the primary common electrode CA relative to the pixel electrode PE located substantially in the center of the pixel PX). That is, in the display mode according to the present embodiment, the microprocessing of the electrodes is not always needed from a low-resolution product specification having a relatively large pixel pitch to a high-resolution product specification having a relatively small pixel pitch, and products with various pixel pitches can be provided by setting the inter-electrode distance. Therefore, it is possible to readily fulfill demands for higher transmittance and higher resolution.

According to the present embodiment, the transmittance is sufficiently reduced regarding a transmittance distribution in the region that overlaps the black matrix BM. The reason is that there is no electric field leakage to the outside of the pixel from the position of the common electrode CE and that no undesired lateral electric field is generated between the pixels adjacent across the black matrix BM so that the liquid crystal molecules in the region that overlaps the black matrix BM maintains the initial alignment state as in the off-state (or the black display). Therefore, even when the color filters of the adjacent pixels are different in color, the mixing of colors can be inhibited, and the deterioration of color reproduction and the deterioration of the contrast ratio can be inhibited.

When the array substrate AR and the countersubstrate CT are out of alignment, the horizontal inter-electrode distances between the common electrode CE and two sides across the pixel electrode PE may be different. However, such misalignment is caused in all the pixels PX, and therefore produces no difference of electric field distribution among the pixels PX and has a significantly small influence on the display of images. Even if the array substrate AR and the countersubstrate CT are out of alignment, undesired electric field leakage to the adjacent pixels can be inhibited. Therefore, even when the color filters of the adjacent pixels are different in color, the mixing of colors can be inhibited, and the deterioration of color reproduction and the deterioration of the contrast ratio can be inhibited.

According to the present embodiment, each of the primary common electrodes CA faces the source wiring line S. Especially when the primary common electrode CAL and the primary common electrode CAR are respectively located immediately above the source wiring line S1 and the source wiring line S2, the aperture AP can be expanded and the transmittance of the pixel PX can be improved as compared with the case where the primary common electrode CAL and the primary common electrode CAR are located closer to the pixel electrode PE than the source wiring line S1 and the source wiring line S2.

The primary common electrode CAL and the primary common electrode CAR are respectively located immediately above the source wiring line S1 and the source wiring line S2, so that the inter-electrode distances between the pixel electrode PE and the primary common electrode CAL as well as the primary common electrode CAR can be increased, and a more horizontal lateral electric field can be formed. This makes it possible to maintain a greater view angle which is an advantage of, for example, an IPS mode that is a conventional configuration.

According to the present embodiment, a plurality of domains can be formed in one pixel. Thus, the view angle can be optically compensated in a plurality of directions, and a greater view angle can be obtained.

Although the initial alignment direction of the liquid crystal molecules LM is parallel to the second direction Y in the example described above, the initial alignment direction of the liquid crystal molecules LM may be a diagonal direction D that diagonally intersects with the second direction Y as shown in FIG. 2. Here, an angle θ1 of the initial alignment direction D with the second direction Y is an angle more than 0° and less than 45°. The angle θ1 is highly effective in controlling the alignment of the liquid crystal molecules LM when about 5° to 30°, preferably 20° or less. That is, the initial alignment direction of the liquid crystal molecules LM is preferably substantially parallel to a direction that is angled at 0° to 20° with the second direction Y.

Although the liquid crystal layer LQ is made of a liquid crystal material having positive dielectric anisotropy in the example described above, the liquid crystal layer LQ may be made of a liquid crystal material having negative dielectric anisotropy. However, although not described in detail, the polarity of the dielectric anisotropy is reversed, so that the angle θ1 is preferably 45° to 90°, particularly preferably 70° or more in the case of a negative liquid crystal material.

Almost no lateral electric field is formed (or no electric field sufficient to drive the liquid crystal molecules LM is formed) on the pixel electrode PE or the common electrode CE even in the on-state, so that the liquid crystal molecules LM hardly move from the initial alignment direction as in the off-state. Thus, even if the pixel electrode PE and the common electrode CE are made of a light-transmitting conductive material such as ITO, the backlight hardly passes through these regions and hardly contributes to display in the on-state. Therefore, the pixel electrode PE and the common electrode CE do not necessarily have to be made of a transparent conductive material, and may be made of a conductive material such as aluminum, silver, or copper.

According to the present embodiment, the structure of the pixel PX is not limited to the example shown in FIG. 2.

FIG. 5 is a plan view schematically showing another structure example of one pixel PX when the liquid crystal display panel LPN shown in FIG. 1 is viewed from the side of the countersubstrate. In the following explanation, components similar to those in the liquid crystal display device described above are provided with the same reference numerals and are not described.

In this example, the pixel electrode PE is formed in the same layer as the source wiring line S. The pixel electrode PE comprises the primary pixel electrode PA and a contact portion PCT. The auxiliary capacitive electrode EC is not disposed on the gate wiring line G. The contact portion PCT of the pixel electrode PE is formed integrally with the lower end of the primary pixel electrode PA. The contact portion PCT is electrically connected to the drain wiring line ED of the switching element SW in the contact hole CH1. Although the contact portion PCT is greater in width in the first direction X than the primary pixel electrode PA in FIG. 5, it is preferable that the contact portion PCT is substantially equal in width in the first direction X to the primary pixel electrode PA in order to improve the numerical aperture.

The drain wiring line ED (semiconductor layer PS) of the switching element SW extends beyond the gate wiring line G2 to overlap the source wiring line S1, and then extends substantially parallel to the first direction X toward the contact portion PCT from the region that overlaps the source wiring line S1. The drain wiring line ED further extends from the region that overlaps the contact portion PCT to overlap the primary pixel electrode PA, and is then connected to (or formed integrally with) the semiconductor layer PSC which is located to overlap the gate wiring line G1. In this case, the retention capacity Cs is formed between the semiconductor layer PSC and the gate wiring line G1.

FIG. 6 is a sectional view schematically showing a sectional structure when the liquid crystal display panel LPN shown in FIG. 1 is cut along the line VI-VI indicated in FIG. 5. Here, components necessary for an explanation are only shown, and other components are not shown.

In this example, the pixel electrode PE is formed in the same layer as the source wiring lines S1 and S2. That is, the source wiring lines S1 and S2 and the primary pixel electrode PA are located on the first interlayer insulating film 12, and the source wiring lines S1 and S2 and the primary pixel electrode PA are covered by the second interlayer insulating film 13.

The shield layer SLD is located on the second interlayer insulating film 13 to face the source wiring lines S1 and S2. The shield layer SLD is covered by the first alignment film AL1.

FIG. 7 is a sectional view schematically showing a sectional structure when the liquid crystal display panel LPN shown in FIG. 1 is cut along the line VII-VII indicated in FIG. 5. Here, components necessary for an explanation are only shown, and other components are not shown.

As shown in FIG. 7, in this example, the entire gate wiring line G2 is located to face the shield layer SLD. That is, the shield layer SLD is grid-shaped to face the source wiring line S and the gate wiring line G.

In other respects, the liquid crystal display device in this example is similar in configuration to the liquid crystal display device described above. Although the auxiliary capacitive electrode EC is not provided in this example, the auxiliary capacitive electrode EC facing the gate wiring line G2 may be provided. When the auxiliary capacitive electrode EC is disposed, the auxiliary capacitive electrode EC is electrically connected to (or formed integrally with) the primary pixel electrode PA. In this case, as a capacity is also formed between the auxiliary capacitive electrode EC and the gate wiring line G2, the retention capacity Cs can be increased.

In this example, the pixel electrode PE is formed in the same layer as the source wiring lines S1 and S2. Therefore, the contact hole CH2 shown in FIG. 2 is not needed, so that the alignment of liquid crystal is not disturbed by the asperities of the part in which the contact hole CH2 is provided, and the deterioration of display quality is inhibited.

In this example, as the pixel electrode PE is disposed in the same layer as the source wiring line S, the shield layer SLD can also be disposed in the part of the gate wiring line G that intersects with the source wiring line S. Consequently, the leakage electric field from the gate wiring line G can be effectively blocked, and the deterioration of display quality is inhibited.

As the shield layer SLD is grid-shaped, the resistance of the shield layer SLD can be reduced. Moreover, as the shield layer SLD is grid-shaped, it is possible to avoid a situation in which a signal cannot be applied to part of the shield layer SLD due to breaking of wire, and the deterioration of display quality can be inhibited.

The shield layer SLD is located on the gate wiring line G and the source wiring line S which are non-transmitting regions. Therefore, the aperture AP can be expanded, and the deterioration of transmittance can be inhibited.

That is, according to the present embodiment, the deterioration of transmittance can be inhibited. As a result, the deterioration of display quality can be inhibited.

FIG. 8 is a plan view schematically showing another structure example of one pixel PX when the liquid crystal display panel LPN shown in FIG. 1 is viewed from the side of the countersubstrate. In the following explanation, components similar to those in the liquid crystal display device described above are provided with the same reference numerals and are not described.

In this example, the pixel electrode PE comprises the primary pixel electrode PA, the secondary pixel electrode PC located in a region that overlaps the gate wiring line G2, the contact portion PCT, and the auxiliary capacitive electrode EC. The contact portion PCT is located in the vicinity of the gate wiring line G2 in the lower adjacent pixel PX.

The drain wiring line ED (semiconductor layer PS) of the switching element SW extends to intersect with the gate wiring line G2 in the region that overlaps the source wiring line S1, and extends along the first direction X from the region that overlaps the source wiring line S1 to the region that overlaps the contact portion PCT, and further extends toward the gate wiring line G2 to overlap the primary pixel electrode PA, and is then electrically connected to the semiconductor layer PSC. The drain wiring line ED is electrically connected to the contact portion PCT in the contact hole CH1.

The section of the center (the line VI-VI) of this pixel PX in the second direction Y is similar to that in FIG. 6.

Figure 9:
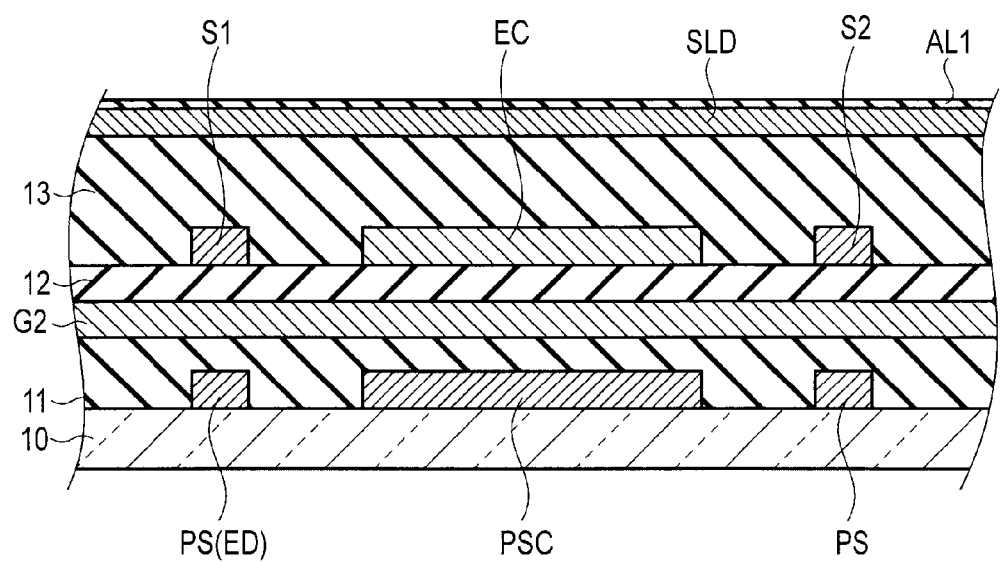
FIG. 9 is a sectional view schematically showing a sectional structure when the liquid crystal display panel shown in FIG. 8 is cut along the line IX-IX.

FIG. 9 is a sectional view schematically showing a sectional structure when the liquid crystal display panel LPN shown in FIG. 1 is cut along the line IX-IX indicated in FIG. 8. Here, components necessary for an explanation are only shown, and other components are not shown.

In this example, the pixel electrode PE is formed in the same layer as the source wiring lines S1 and S2, as in the case shown in FIG. 5. That is, the source wiring lines S1 and S2 and the auxiliary capacitive electrode EC are located on the first interlayer insulating film 12. The source wiring lines S1 and S2 and the auxiliary capacitive electrode EC are covered by the second interlayer insulating film 13.

The shield layer SLD is located on the second interlayer insulating film 13 to face the entire gate wiring line G2. The shield layer SLD is covered by the first alignment film AL1. That is, the shield layer SLD is grid-shaped to face the source wiring line S and the gate wiring line G.

In other respects, the liquid crystal display device in this example is similar in configuration to the above-described liquid crystal display device shown in FIG. 5. That is, in the case shown in FIG. 8, the retention capacities Cs are formed between the semiconductor layer PSC and the gate wiring line G and between the secondary pixel electrode PC and the gate wiring line G in the region that overlaps the gate wiring line G for controlling the gate voltage of the switching element SW in each pixel PX.

In this example, the pixel electrode PE is located in the same layer as the source wiring lines S1 and S2. Therefore, the contact hole CH2 shown in FIG. 2 is not needed, so that the alignment of liquid crystal is not disturbed by the asperities of the part in which the contact hole CH2 is provided, and the deterioration of display quality is inhibited.

In this example, as the pixel electrode PE is disposed in the same layer as the source wiring line S, the shield layer SLD can also be disposed in the part of the gate wiring line G that intersects with the source wiring line S. Consequently, the leakage electric field from the gate wiring line G can be effectively blocked, and the deterioration of display quality is inhibited.

As the shield layer SLD is grid-shaped, the resistance of the shield layer SLD can be reduced. Moreover, as the shield layer SLD is grid-shaped, it is possible to avoid a situation in which a signal cannot be applied to part of the shield layer SLD due to breaking of wire, and the deterioration of display quality can be inhibited.

The shield layer SLD is located on the gate wiring line G and the source wiring line S which are non-transmitting regions. Therefore, the aperture AP can be expanded, and the deterioration of transmittance can be inhibited.

That is, according to the present embodiment, the deterioration of transmittance can be inhibited. As a result, the deterioration of display quality can be inhibited.

As described above, according to the present embodiment, it is possible to provide a liquid crystal display device in which the deterioration of display quality can be inhibited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate, the first substrate comprising a gate wiring line, a source wiring line which extends to intersect with the gate wiring line, a pixel electrode which comprises a primary pixel electrode extending substantially parallel to the source wiring line, and a switching element located at the intersection of the gate wiring line and the source wiring line;
a second substrate comprising two primary common electrodes which extend substantially parallel to the primary pixel electrode on both sides across the primary pixel electrode; and
a liquid crystal layer comprising liquid crystal molecules held between the first substrate and the second substrate,
wherein the switching element comprises a drain wiring line which is electrically connected to the pixel electrode and which is located to overlap the gate wiring line, and the drain wiring line extends to intersect with the gate wiring line and overlaps the source wiring line, extends substantially parallel to the gate wiring line from a region that overlaps the source wiring line, and extends to overlap the primary pixel electrode up to a region that overlaps the gate wiring line.

2. The liquid crystal display device according to claim 1, wherein the gate wiring line which the drain wiring line overlaps is an adjacent gate wiring line that controls a gate voltage of a switching element of an adjacent pixel.

3. The liquid crystal display device according to claim 2, wherein the pixel electrode is disposed in the same layer as the source wiring line,
the liquid crystal display device further comprising a shield layer disposed in a grid shape on an upper layer of the source wiring line and an upper layer of the gate wiring line.

4. The liquid crystal display device according to claim 1, wherein the pixel electrode is disposed in the same layer as the source wiring line,
the liquid crystal display device further comprising a shield layer disposed in a grid shape on an upper layer of the source wiring line and an upper layer of the gate wiring line.

5. The liquid crystal display device according to claim 1, wherein the pixel electrode comprises a secondary pixel electrode located on an upper layer of the gate wiring line except for a region where the source wiring line intersects with the gate wiring line.

6. A liquid crystal display device comprising:
a first substrate, the first substrate comprising a gate wiring line, a source wiring line which extends to intersect with the gate wiring line, a pixel electrode which comprises a primary pixel electrode extending substantially parallel to the source wiring line, a switching element located at the intersection of the gate wiring line and the source wiring line, and an auxiliary capacitive electrode which is electrically connected to the pixel electrode and which is located to overlap the gate wiring line;
a second substrate comprising two primary common electrodes which extend substantially parallel to the primary pixel electrode on both sides across the primary pixel electrode; and
a liquid crystal layer comprising liquid crystal molecules held between the first substrate and the second substrate,
wherein the pixel electrode comprises a secondary pixel electrode electrically connected to the auxiliary capacitive electrode in a second contact hole provided at a position that overlaps the gate wiring line.

7. The liquid crystal display device according to claim 6, wherein the gate wiring line which the auxiliary capacitive electrode overlaps is an adjacent gate wiring line that controls a gate voltage of a switching element of an adjacent pixel.

8. The liquid crystal display device according to claim 6, wherein the gate wiring line which the auxiliary capacitive electrode overlaps is a gate wiring line that controls a gate voltage of the switching element.

9. The liquid crystal display device according to claim 6, wherein the pixel electrode is disposed in the same layer as the source wiring line,
the liquid crystal display device further comprising a shield layer disposed in a grid shape on an upper layer of the source wiring line and an upper layer of the gate wiring line.

10. The liquid crystal display device according to claim 6, wherein the secondary pixel electrode is located on an upper layer of the gate wiring line except for a region where the source wiring line intersects with the gate wiring line.

11. A liquid crystal display device comprising:
- a first substrate, the first substrate comprising a gate wiring line, a source wiring line which extends to intersect with the gate wiring line, a pixel electrode which comprises a primary pixel electrode extending substantially parallel to the source wiring line, a switching element located at the intersection of the gate wiring line and the source wiring line, and an auxiliary capacitive electrode which is electrically connected to the pixel electrode and which is located to overlap the gate wiring line;
- a second substrate comprising two primary common electrodes which extend substantially parallel to the primary pixel electrode on both sides across the primary pixel electrode; and
- a liquid crystal layer comprising liquid crystal molecules held between the first substrate and the second substrate,
- wherein the switching element comprises a drain wiring line which is electrically connected to the pixel electrode and which is located to overlap the gate wiring line, and
- the pixel electrode comprises a secondary pixel electrode electrically connected to the auxiliary capacitive electrode in a second contact hole provided at a position that overlaps the gate wiring line.

12. The liquid crystal display device according to claim 11, wherein the gate wiring line which the drain wiring line overlaps is an adjacent gate wiring line that controls a gate voltage of a switching element of an adjacent pixel.

13. The liquid crystal display device according to claim 12, wherein the pixel electrode is disposed in the same layer as the source wiring line, the liquid crystal display device further comprising a shield layer disposed in a grid shape on an upper layer of the source wiring line and an upper layer of the gate wiring line.

14. The liquid crystal display device according to claim 11, wherein the gate wiring line which the auxiliary capacitive electrode overlaps is an adjacent gate wiring line that controls a gate voltage of a switching element of an adjacent pixel.

15. The liquid crystal display device according to claim 11, wherein the gate wiring line which the auxiliary capacitive electrode overlaps is a gate wiring line that controls a gate voltage of the switching element.

16. The liquid crystal display device according to claim 11, wherein the pixel electrode is disposed in the same layer as the source wiring line,
the liquid crystal display device further comprising a shield layer disposed in a grid shape on an upper layer of the source wiring line and an upper layer of the gate wiring line.

17. The liquid crystal display device according to claim 11, wherein the secondary pixel electrode is located on an upper layer of the gate wiring line except for a region where the source wiring line intersects with the gate wiring line.

18. The liquid crystal display device according to claim 11, wherein the drain wiring line extends to intersect with the gate wiring line and thus overlap the source wiring line, extends substantially parallel to the gate wiring line from a region that overlaps the source wiring line, and extends to overlap the primary pixel electrode up to a region that overlaps the gate wiring line.

* * * * *